United States Patent

Wardenier

[11] Patent Number: 5,249,477
[45] Date of Patent: Oct. 5, 1993

[54] DEVICE FOR TRANSMITTING A CONTROL MOTION OR SHIFTING MOTION, IN PARTICULAR FOR SHIFTING GEARS IN AN AUTOMOTIVE-VEHICLE TRANSMISSION

[75] Inventor: Wilhelm M. T. Wardenier, Wehrheim, Fed. Rep. of Germany

[73] Assignee: RCS Remote Control Systems GmbH, Bad Homburg, Fed. Rep. of Germany

[21] Appl. No.: 674,529

[22] Filed: Mar. 22, 1991

[30] Foreign Application Priority Data

Jan. 15, 1991 [DE] Fed. Rep. of Germany ....... 4101010

[51] Int. Cl.⁵ .................. G05G 9/02; B60K 20/04; F16C 1/12
[52] U.S. Cl. .................. 74/473 R; 74/417; 74/471 XY; 74/501.6
[58] Field of Search ............ 74/473 R, 417, 491, 74/471 XY, 501.6

[56] References Cited

U.S. PATENT DOCUMENTS

| | | | |
|---|---|---|---|
| 3,811,336 | 5/1974 | Pulskamp | 74/471 XY |
| 4,028,958 | 6/1977 | Schuermann et al. | 74/471 XY |
| 4,133,218 | 1/1979 | Carter | 74/471 XY |
| 4,458,549 | 7/1984 | Tani et al. | 74/473 R |
| 4,483,211 | 11/1984 | Hurlow | 74/501.6 X |
| 4,630,500 | 12/1986 | Suzuki | 74/473 R |
| 4,671,131 | 6/1987 | Hurlow | 74/473 R X |
| 5,005,411 | 4/1991 | Miyagi et al. | 74/471 XY X |

FOREIGN PATENT DOCUMENTS 55-138124 10/1980 Japan ............... 74/471 XY

Primary Examiner—Allan D. Herrmann
Assistant Examiner—Julie A. Krolikowski
Attorney, Agent, or Firm—Herbert Dubno

[57] ABSTRACT

In a control device for shifting gears in an automotive-vehicle transmission, including a lever for input of the shifting motion that is pivotal about a first axis (I) in a first plane and about a second axis (II) in a second plane perpendicular to the first plane, and including output members movable substantially parallel to the first axis (I), the first output member is coupled to the lever via a joint and transfers a pivotal motion of the lever about the second axis (II), while the second output member is kinematically coupled to the lever by an interposed angular revolving train and transfers a pivotal motion of the lever about the first axis (I). The train has an input shaft and an output shaft that is perpendicular to the input shaft and is connected thereto by interengaging bevel gears. The lever is pivotally mounted on the input shaft so as to pivot about the second axis (II), and the second output member is connected to the output shaft by a one-armed output lever.

24 Claims, 5 Drawing Sheets

DEVICE FOR TRANSMITTING A CONTROL MOTION OR SHIFTING MOTION, IN PARTICULAR FOR SHIFTING GEARS IN AN AUTOMOTIVE-VEHICLE TRANSMISSION

FIELD OF THE INVENTION

This invention relates to a device for transferring a control motion or shifting motion, in particular for shifting gears in an automotive-vehicle transmission, including a lever for input of the motion that is pivotal about a first axis in a first plane and about a second axis in a second plane that is in particular perpendicular to the first plane, and including output members movable substantially parallel to the first axis, a first output member being coupled to the lever by means of a joint and transferring a pivotal motion of the lever about the second axis, and a second output member being kinematically coupled to the lever by an interposed train and transferring a pivotal motion of the lever about the first axis.

THE RELATED ART

A device of the type referred to in the foregoing is known from European Patent Application EP 238 182 A2 disclosing an actuator mechanism of a gear shifting system, including two push-pull cables operating as output members to transfer the shifting motion to a gear shifting device located remotely from the actuator mechanism on the vehicle transmission unit. In the known device, the second output member is coupled to an arm of an angle lever that is mounted at its apex together with the gear shift lever on a pin which provides the second axis and is pivotal about the first axis. The other arm of the angle lever is mounted through a joint support on a mounting assembly pivotally carrying the gear shift lever about its first axis. Considering that in this arrangement the effective lever lengths vary in dependence upon the pivot angle on movement of the gear shift lever about the first axis, the ratio of the pivotal motion of the gear shift lever to the resultant longitudinal motion of the second output member is not linear. Further, the known device is not provided for use in a variety of mounting positions and different directions of motion and ratios.

It is an object of the present invention to provide a device for transferring a control motion or shifting motion of the type initially referred to, in which the ratio is constant in both directions of motion to be transmitted. It is a further object herein to provide a device which, without requiring constructional alterations, is suitable for a variety of mounting positions and allows a reversal of the direction of motions transferred.

SUMMARY OF THE INVENTION

According to the present invention, the aforementioned objects are attained in that the train is an angular revolving train with a constant ratio having an input shaft and an output shaft that is perpendicular to the input shaft and is kinematically coupled thereto by drive means arranged in a positive interengaging relationship, that the lever is pivotal about the second axis, being mounted on the input shaft of the train providing the first axis, and that the second output member is connected to the output shaft by means of a one-armed output lever or a corresponding transmitting means.

The invention provides a device of particularly straightforward structure enabling a motion to be transferred at a constant ratio in both directions of movement. Further, by mounting the lever on the input shaft of the angular revolving train the possibility exists to freely select the position of the output shaft in a range of 360° about the axis of the input shaft, without the need to modify the construction. This results in a plurality of possibilities to accommodate a variety of applications and mounting situations. The direction of the output lever being equally freely selectable, further numerous possibilities result in respect of the arrangement of the second output member and the direction of the output motion of the second output member in relation to the input motion. The lever for introducing the motion may be a one-armed or a two-armed lever. Depending on the lever configuration, this makes it possible to accomplish two relatively opposite output motions also with a view to the first output member relative to the input motion.

According to the invention, the angular revolving train is preferably constructed as a bevel gear train. This provides a simple and compact train structure allowing the use of low-cost standard components. It will be understood, however, that the invention may also be executed with other configurations of angular revolving trains, using, for example, joint couplings. The ratio of the angular revolving train may be 1 or unequal to 1, the latter ratio being chosen, for example, to satisfy special force or displacement requirements.

To mount the output lever on the output shaft, the invention may provide a clamp-type coupling that is adapted to be clamped to the output shaft in a wide variety of angular positions. Further, for a simple alteration of the ratios, the lever and the output lever may include several longitudinally adjacent connecting bores for mounting the output members.

A simple mounting of the lever on the input shaft may be accomplished according to the invention in that the end of the input shaft is split in the manner of a fork by a central slot, and that the lever is carried in the slot on a trunnion extending transversely through the slot. Further provisions may include a radial angled portion on the input shaft and mounting of the lever on the angled portion with its second axis which is remote from the axis of rotation of the input shaft. Such a further development permits a reduction in the distance between the input shaft and the first output member without affecting the kinematic conditions, and a reduction in the arc length of the motion of the mounting end of the first output member caused by rotation of the input shaft. Both features contribute to reducing the required mounting space, being suitable particularly in cases where the second output member is adjacent to a casing side different from the casing side to which the first output member is adjacent.

When the lever is mounted on an angled portion of the input shaft, in a further proposal of the invention the distance between the axis of rotation of the input shaft and the second axis may be dimensioned such that the longitudinal axis of the first output member coincides with the axis of rotation of the input shaft. In this arrangement, it may be advantageous according to the invention if the input shaft has a central longitudinal bore receiving the first output member. Such an arrangement affords the advantage of practically preventing the first output member from being deflected due to rotations of the input shaft, whereby buckling stress can be reduced. Further, the central arrangement of the first output member relative to the casing of the train simplifies the configuration and supporting structure of the guides necessary for the first output member, because, by virtue of their central position, the guides are independent of the mounting position of the train. In this embodiment of the invention, it may be further provided that the first output member is axially guided in the longitudinal bore of the input shaft and that the lever is longitudinally movably supported on the mounting structure providing the second axis. In this embodiment, the lever is thus guided by the joint by means of which the lever is coupled to the first output member, with the supporting structure of the lever mounting becoming longitudinally displaceable as necessary in order to compensate for the changes in distance caused by the pivotal motion of the lever about the second axis. This embodiment permits a deflection-free, axial mounting of the mounting ends of the first output member within the input shaft, thus enabling comparatively high forces to be transmitted through the first output member.

According to a further proposal of the invention, the casing has on its side remote from the input shaft a tubular connection piece aligned coaxially with the input shaft and carrying at its free end a counter-supporting structure for the guide of the output members. The tubular connection piece further offers the possibility to secure the device in the desired mounting position using uniform and simple means, such means acting upon the cylindrical circumferential surface of the tubular connection piece. According to the invention, the counter-supporting structure may be mounted by means of connecting elements adapted to be connected to the casing of the train in mirror-inverted fashion and/or in several angular positions, so that the position of the guides can be adapted to the selected arrangement of the output members relative to the casing of the train.

The device of the invention is particularly suitable for use in apparatus in which control or shifting motions are transferred by means of push-pull cables, with the output members being advantageously formed by the movable connecting ends of the push-pull cables. The device of the invention is particularly suitable for use as an actuator for a cable gear shift system for shifting the gears within a transmission unit for automotive vehicles, particularly trucks and busses. In such applications, the shifting motion which requires a higher actuating force to effect clutch engagement is preferably transmitted by the shift cable corresponding to the first output member, while the selecting motion which requires lower forces for selecting the desired gear rail is transmitted by the selector cable corresponding to the second output member, with the train interposed. In such an application, the device of the invention offers the possibility of adapting to a variety of transmissions and mounting situations in various types of vehicle, without involving appreciable constructional modifications. Accordingly, the device of the invention affords economy of manufacture in comparatively large quantities as well as low replacement part and inventory cost because of the small variety of parts required.

BRIEF DESCRIPTION OF THE DRAWING

Embodiments of the invention will be described in more detail in the following with reference to the accompanying drawings.

In the drawings.

DETAILED DESCRIPTION

Figure 1:
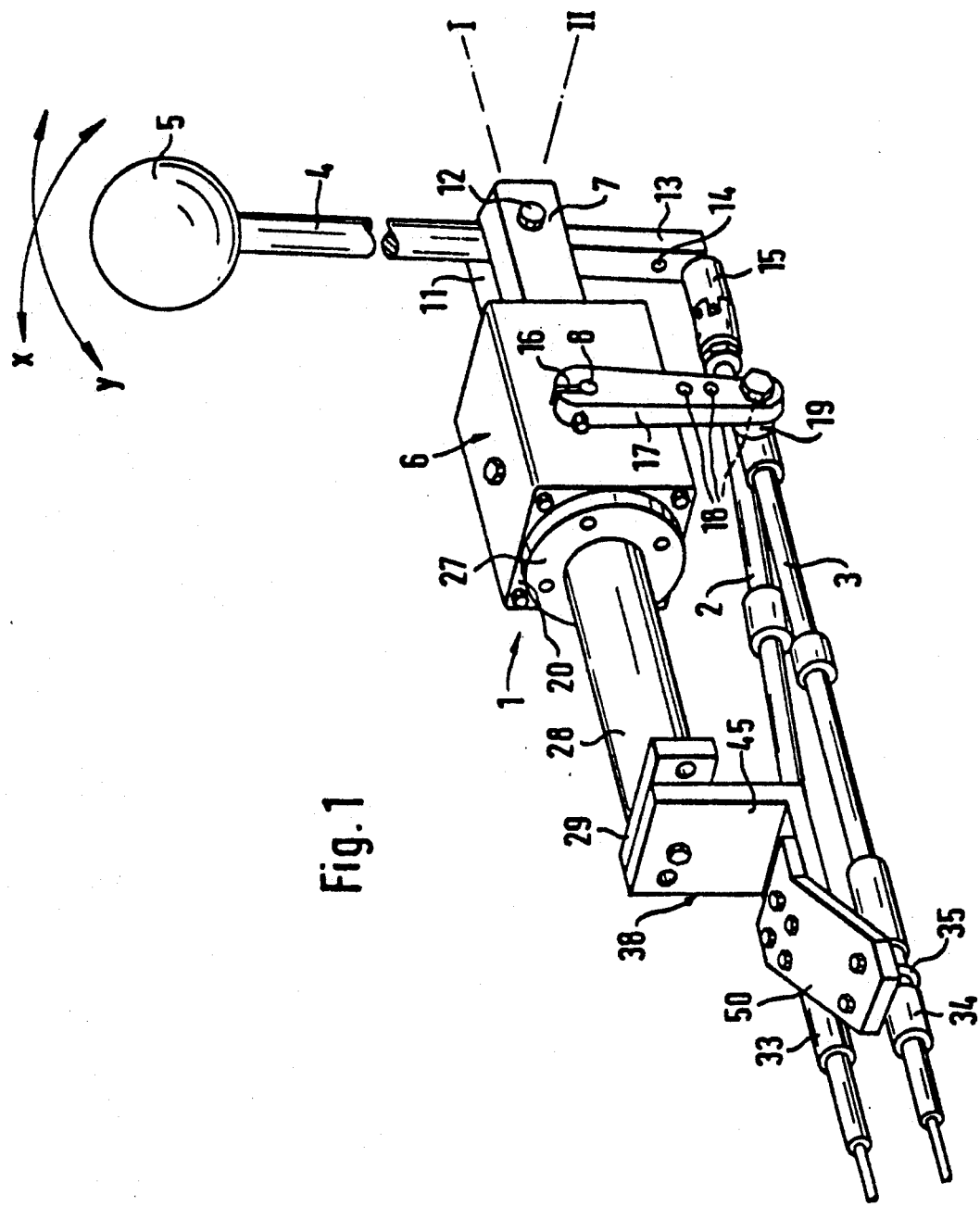
FIG. 1 is a perspective view of a control device of the invention for input of the shifting motions for shifting gears in an automotive-vehicle transmission.
Figure 2:
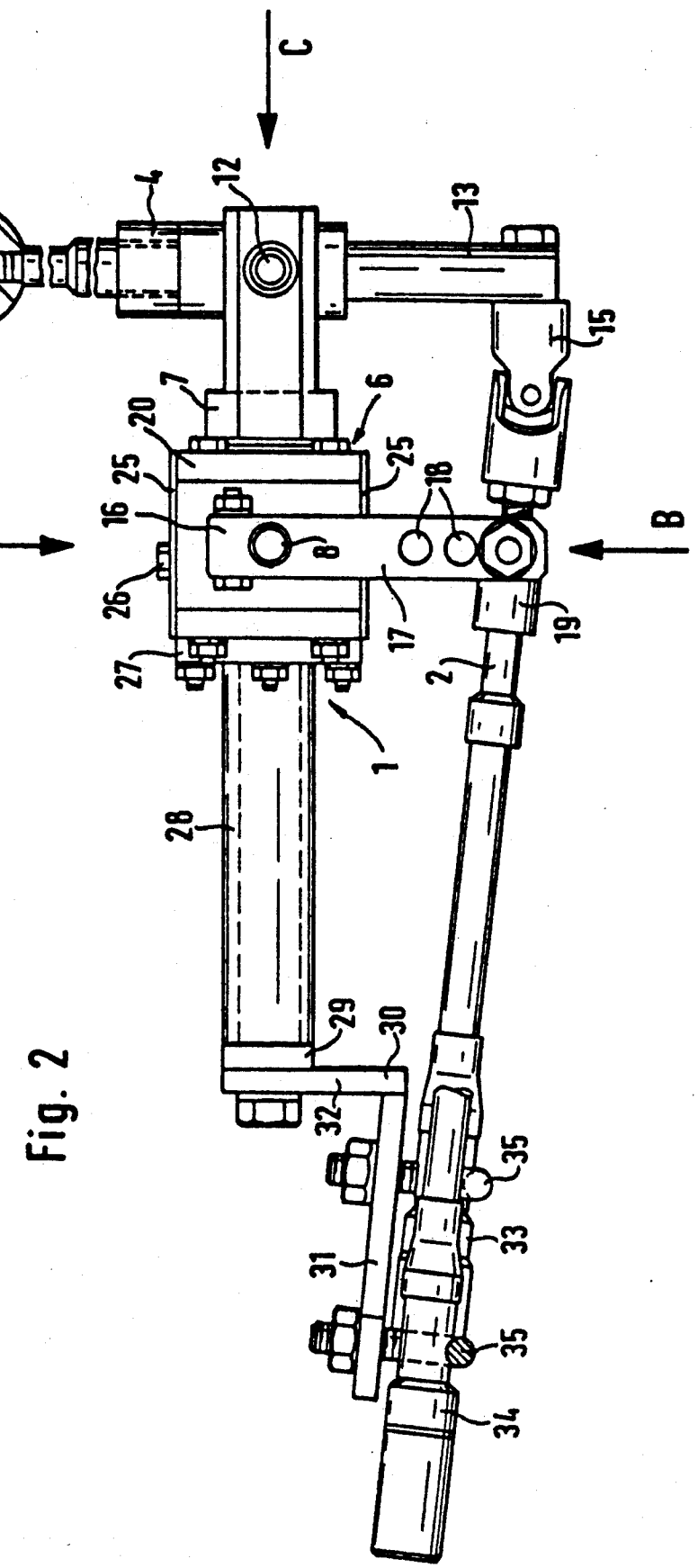
FIG. 2 is a side view of the control device of FIG. 1 illustrating a slightly modified embodiment thereof.
Figure 3:
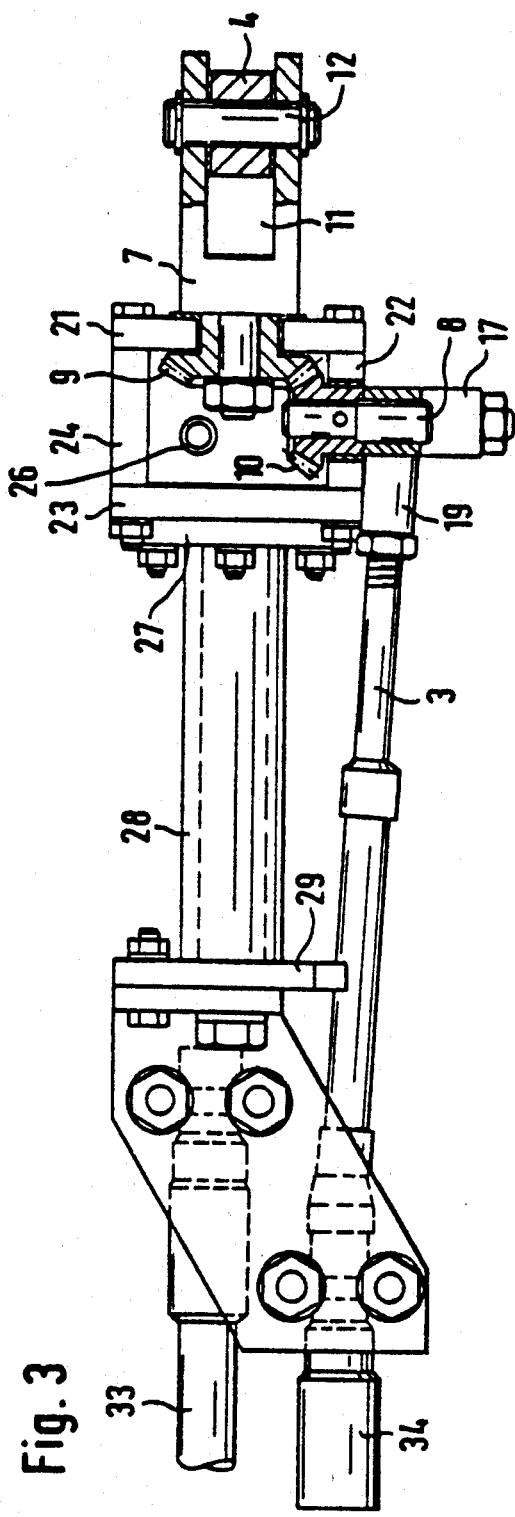
FIG. 3 is a view of the control device, partly sectioned on the line A of FIG. 2.
Figure 4:
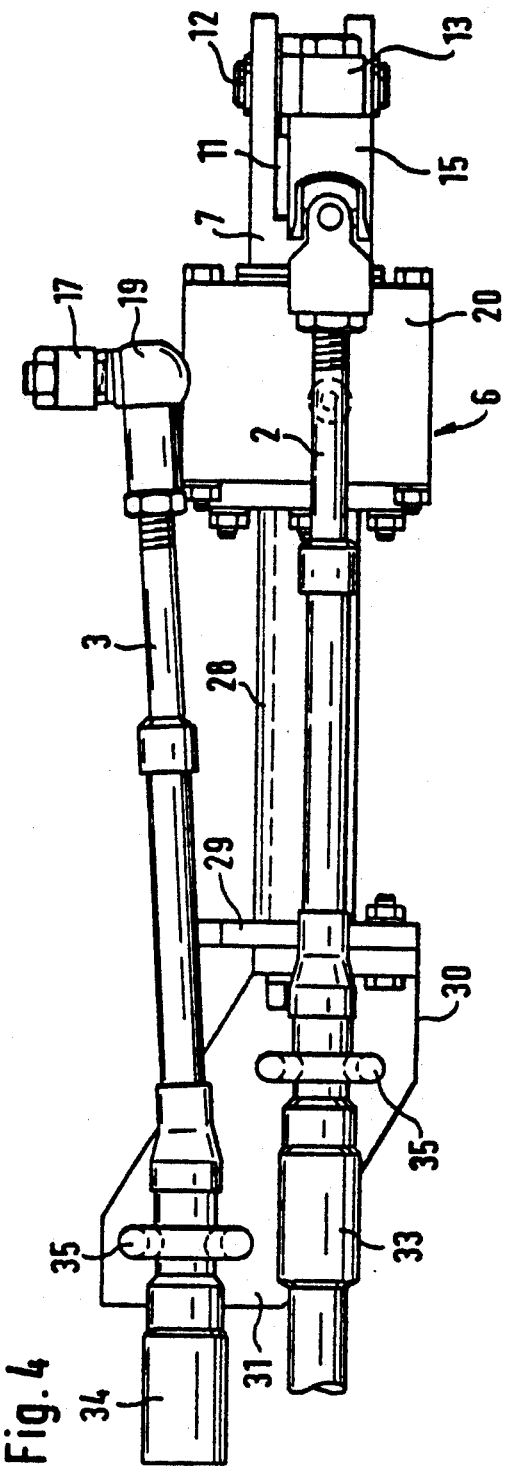
FIG. 4 is a view of the control device taken on the line B of FIG. 2.
Figure 5:
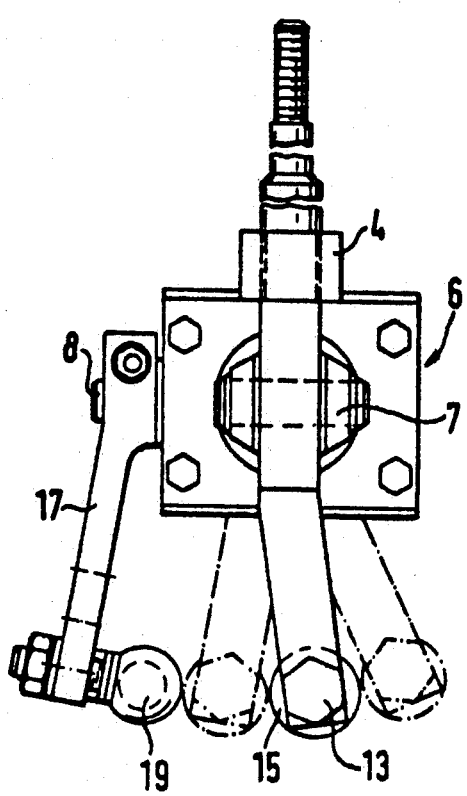
FIG. 5 is a view of the control device taken on the line C of FIG. 2.

Referring now to FIGS. 1 to 5, there is shown a control device 1 provided for input of the control instructions in a cable shifting system for trucks or busses. The control device 1 is coupled to a shift cable 2 and to a selector cable 3 which transfer the control motions of a lever 4 to a transmission unit located remotely from the control device 1. The control device 1 is generally mounted beneath the floor of the engine cover of the driver's cab, with the lever 4 which has a knob 5 at one end thereof extending into the driver's cab.

The control device 1 includes a train 6 having an input shaft 7 and an output shaft 8 arranged at relative right angles, the shafts being kinematically connected to each other by means of bevel gears 9, 10. The lever 4 is configured as a two-armed lever. It is rotatably mounted in a central longitudinal slot 11 of the input shaft 7 on a trunnion 12 extending through transverse bores in the input shaft 7 and the lever 4. At its end 13 opposite the knob 5, a universal joint 15 is secured in one of two bores 14 to couple the lever 4 to the shift cable 2. Connected to the output shaft 8 by means of a clamp-type coupling 16 is an output lever 17 which is in substantially parallel alignment with the lever 4. The output lever 17 has at its free end three bores 18, one of the bores receiving the trunnion of a ball joint 19 coupling the output lever 17 to the selector cable 3.

The cuboid casing 20 of the train 6 comprises four rectangular panels 21, 22, 23, 24 which are connected to each other by means of screws and studs. The panels 21, 22 include central mounting bores in which the mounting sleeves for receiving the bevel gears 9, 10 are inserted. The bevel gear 9 is mounted in the panel 21 and connected to the input shaft 7 by threaded engagement therewith so as to prevent relative rotation. The bevel gear 10 is mounted in the panel 22. Its connection to the output shaft 8 in a manner preventing relative rotation is accomplished by a locking pin received in a transverse bore. Cover panels 25 placed on the top and bottom ends of the panels 21 to 24 close and seal the casing 20 in a dust-proof manner. The cover panels 25 are held down by a screw 26 extending through the casing 20.

A flange 27 of a tubular connection piece 28 is screwed to the outside of the panel 23 of the casing 20. The tubular connection piece 28 may be used for mounting the control device in the vehicle, with the cylindrical circumferential surface of the tubular connection piece 28 making it easier to vary the mounting position. At its free end, the tubular connection piece 28 has an anchor plate 29 to which a counter-supporting structure 30 is affixed. In the control device illustrated in FIGS. 2 to 5, the counter-supporting structure is an approximately rhombiform plate 31 having an angled leg 32 secured to the anchor plate 29 by means of screws. On the underside of the plate 31, U-shaped clamps 35 which extend through relatively offset pairs of bores in the plate 31 and are secured by means of nuts, affix a guide sleeve 33 slidably receiving the shift cable 2 and substantially parallel thereto a juxtaposed guide sleeve 34 slidably receiving the selector cable 3.

By virtue of its mounting on the input shaft 7, the lever 4 is adapted to pivot in the direction x about an axis I and in the direction y about an axis II. Pivotal motion in the direction x is made possible by a rotary motion of the input shaft 7. This rotary motion is transmitted through the bevel gears 9, 10 and the output shaft 8 to the output lever 17 which moves the selector cable 3 in the longitudinal direction in accordance with its rotation. This movement of the selector cable 3 causes in the transmission unit a select motion of its selector shaft by means of which the desired gear rail for engagement of the desired gear is selected. For gear engagement, it is necessary to move the lever 4 in the direction y. This motion is directly translated into a longitudinal motion of the shift cable 2 by the end 13 of the lever 4 through the universal joint 15. Movement of the shift cable 2 causes, through the transmission unit, a rotary motion of the selector shaft resulting in engagement of the transmission clutch of the selected gear.

Figure 6:
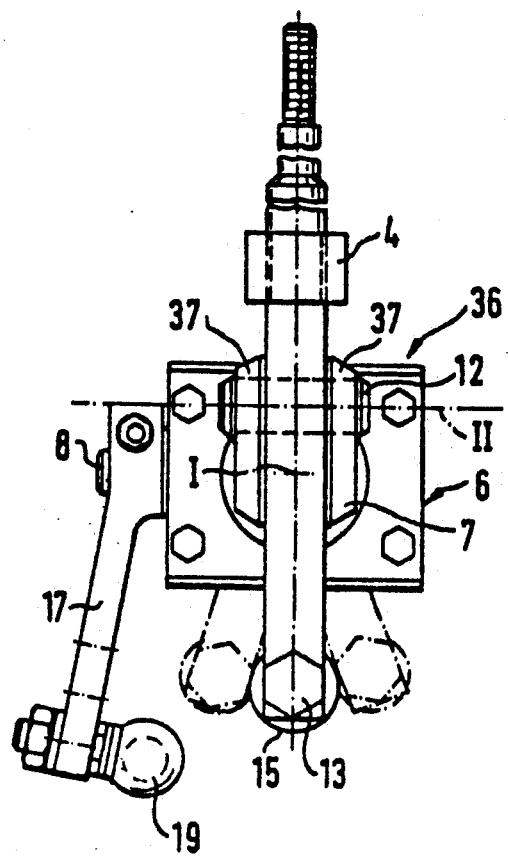
FIG. 6 is a view of an embodiment of the control device taken on the line C of FIG. 2, in which the input shaft is angled.

The control device 36 illustrated in FIG. 6 is identical to the control device 1 with the exception of the mounting of the lever 4 on the input shaft 7. In the control device 36, the input shaft 7 is provided with an angled portion 37. At a distance to the axis I, the angled portion 37 includes a transverse bore receiving the trunnion 12 providing the pivot axis II of the lever 4. Accordingly, the axes I and II are arranged at a relative distance determined by the length of the angled portion 37. With regard to the sequences of motion and the effective lever lengths, the control device 36 does not differ from the control device 1. However, it has the advantage that the universal joint 15 is spaced a smaller distance from the axis I, so that the arc length of the motion of the universal joint 15 is shorter than in the control device 1 at a given angle of rotation of the input shaft 7 corresponding to a movement of the lever 4 in the direction x. This results in lower space requirements and reduced buckling of the shift cable 2. If the control device 36 uses, in lieu of the two-armed lever 4, a one-armed lever having its end mounted on the trunnion 12, the input shaft 7 is suitably turned through 180° causing the angled portion 37 to point downwards when viewing the drawing.

Figure 7:
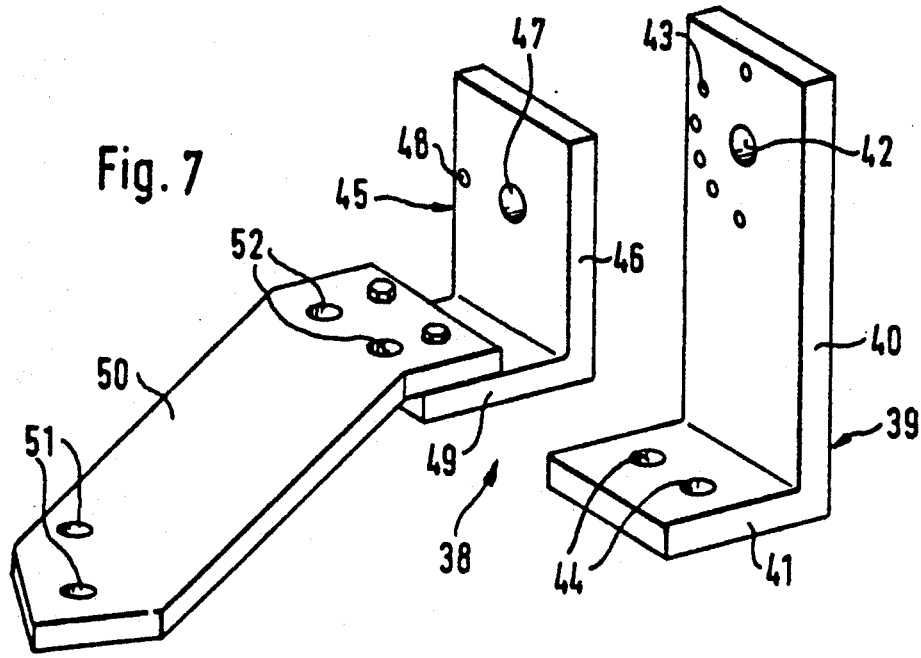
FIG. 7 is a perspective view of an embodiment of a counter-supporting structure for the control device of FIG. 1 or 2.
Figure 8A:
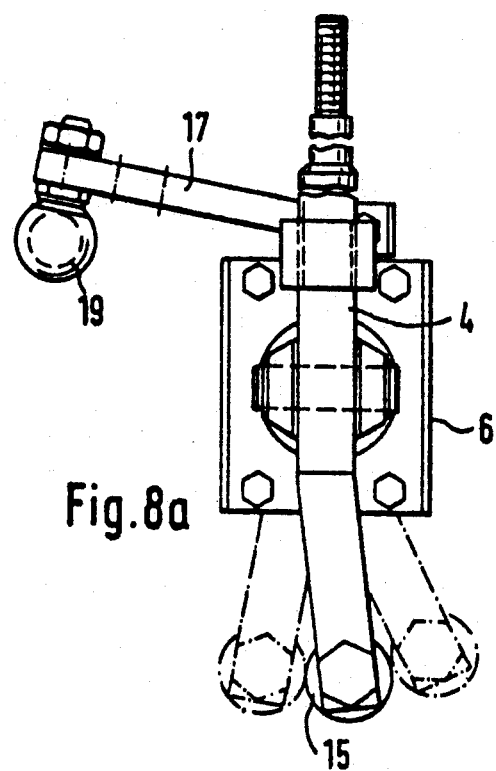
FIGS. 8a to 8d are views of the control device, taken on the line C of FIG. 2, illustrating various mounting possibilities.
Figure 8B:
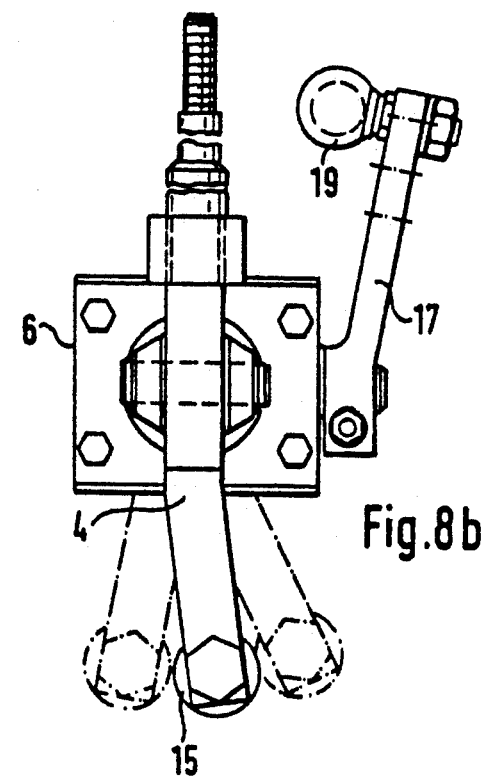
Figure 8C:
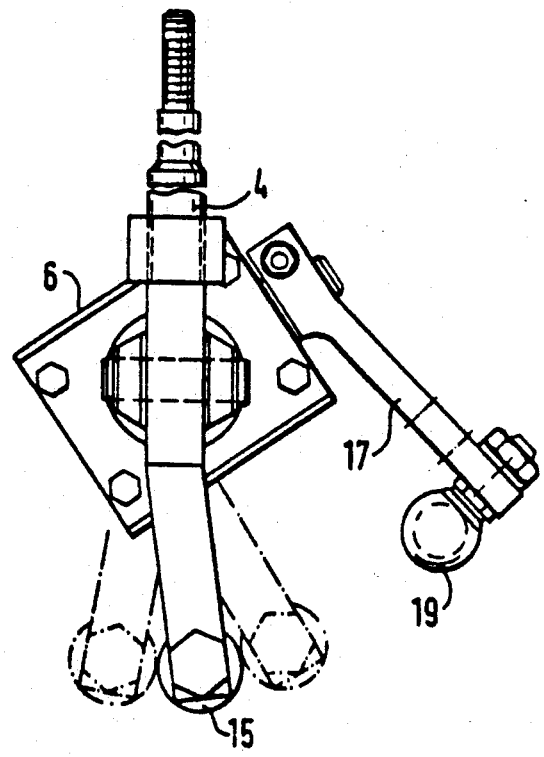
Figure 8D:
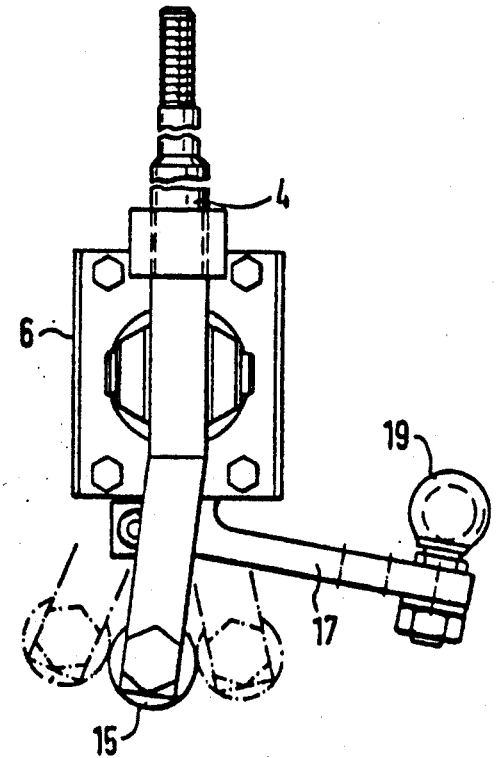

FIG. 7 shows a counter-supporting structure 38 adapted to be mounted on the tubular connection piece 28 in lieu of the counter-supporting structure 30. The counter-supporting structure 38 is comprised of an L-member 39 having a long leg 40 and a short leg 41. The leg 40 includes a center bore 42 and concentrically therewith a ring of bores 43 comprised of a plurality of bores. A pair of bores 44 is provided on the leg 41 to fasten a clamp 35. Adapted to be connected to the leg 40 is a second L-member 45 whose leg 46 includes equally a center bore 47 and an adjacent bore 48 spaced from the center bore 47 at the same distance as the bores of the ring of bores 43 relative to the center bore 42. A rhombiform mounting plate 50 is detachably secured by screws to the other leg 49 of the L-member 45. Similar to the plate 31, the mounting plate 50 has two relatively offset pairs of bores 51, 52.

As shown in FIG. 1, the counter-supporting structure 38 may be used for fastening the guide sleeves 33, 34 in the same manner as the counter-supporting structure 30, if the shift cable 2 and the selector cable 3 are arranged as shown. The L-member 39 is then not required.

If the arrangement of the output lever 17 is the mirror image of the position illustrated in FIG. 1, which is obtainable by a rotation of the casing 20 through 180° about the axis I and a relocation of the output lever 17, for example, in order to reverse the direction of the selecting motion, adaptation of the counter-supporting structure 38 to the reversed arrangement of the guide sleeves 33, 34 merely requires that the mounting plate 50 be mounted on the L-member 45 in turned-over position. If another mounting position is required such as the one shown in FIG. 8 in which the casing 20 is rotated through 90°, in which position the output lever 17 is on the side of the casing opposite the shift cable 2, it is also necessary to correspondingly rotate the L-member 45 with its mounting plate 50 through 90°. Because then the guide sleeve 33 of the shift cable 2 can be no longer secured to the mounting plate 50, the L-member 39 is inserted between the anchor plate 29 and the L-member 45. The two L-members 39, 45 are fastened by a first screw extending through the center bores 42, 47 as well as by a second screw extending through the bore 48 and a suitable bore of the ring of bores 43.

With the variation capabilities described, the counter-supporting structure 38 is also suitable for a plurality of further mounting possibilities of the control devices described, of which only a few are illustrated in FIG. 8. In all mounting variants, the L-member 39 has its long leg 40 in parallel arrangement with the longitudinal axis of the lever 4, while the leg 49 of the L-member 46 and the mounting plate 50 secured thereto are in parallel arrangement with the axis of rotation of the output shaft 8. The ring of bores 43 with its plurality of bores enables the L-member 45 to be secured to the L-member 39 in the desired position.

Further possibilities of variation with regard to the configuration of the control device of the invention are provided by using a one-armed lever 4. In such a one-armed lever structure, the lever 4 has at its end 13 a transverse bore for mounting it on the trunnion 12 of the input shaft 7. The bores 14 for mounting the universal coupling 15 are then at that location on the lever 4 where in the two-armed lever structure the transverse bore for the trunnion 12 is provided.

I claim:

1. A device for transferring a control motion or shifting motion, in particular for shifting gears in an automotive-vehicle transmission, including a lever for input of the motion that is pivotal about a first axis in a first plane and about a second axis in a second plane that is in particular perpendicular to the first plane, and including output members movable substantially parallel to the first axis, a first output member being directly connected to the lever by means of a joint and only transferring a pivotal motion of the lever about the second axis, and a second output member being kinematically coupled to the lever by an interposed train and only transferring a pivotal motion of the lever about the first axis, wherein the train is an angular revolving train with a constant ratio having a sealed housing and extending out of the housing an input shaft and an output shaft that is perpendicular to the input shaft and is kinematically coupled thereto by drive means arranged in a positive interengaging relationship, wherein the lever is pivotal about the second axis, being mounted on the input shaft of the train providing the first axis, and wherein the second output member is connected to the output shaft by transmitting means.

2. The device as claimed in claim 1, wherein the train is constructed as a bevel gear train including bevel gears.

3. The device as claimed in claim 1 wherein the ratio of the train is unequal to 1.

4. The device as claimed in claim 1 wherein second output member is connected to the output shaft by a one-armed output level, with the output lever being adapted to be clamped to the output shaft in a wide variety of angular positions by means of a clamp-type coupling.

5. The device as claimed in claim 1 wherein a one-armed output lever connects the second output member to the output shaft, the lever and the output lever include several longitudinally adjacent connecting bores for mounting the output members.

6. The device as claimed in claim 1 wherein the end of the input shaft is split in the manner of a fork by a central slot, and that the lever is carried in the slot on a trunnion extending transversely through the slot.

7. The device as claimed in claim 1 wherein the input shaft has a radial angled portion and that the lever is mounted on the angled portion with its second axis (II) which is remote from the axis of rotation of the input shaft.

8. The device as claimed in claim 1 wherein the first output member is arranged in a central longitudinal bore of the input shaft.

9. The device as claimed in claim 1 wherein the input shaft has a central longitudinal bore within which the first output member is axially guided and the lever is longitudinally movably supported on a mounting structure providing the second axis.

10. The device as claimed in claim 1 wherein the housing has on its side remote from the input shaft a tubular connection piece aligned coaxially with the input shaft and carrying at a free end of the connection piece a counter-supporting structure for a guide of the output member.

11. The device as claimed in claim 10 wherein the counter-supporting structure includes connecting elements which are adapted to be connected to the housing of the train in a manner selected from the group consisting of a mirror-inverted fashion, an angular position fashion and combinations thereof.

12. The device as claimed in claim 1 wherein the output members are the movable connecting ends of push-pull cables.

13. A device for transferring a shifting motion for shifting gears in an automotive vehicle transmission comprising:
a lever for input of the shifting motion, the lever being pivotal about a first axis in a first plane and about a second axis in a second plane, the planes being perpendicular to one another;
an angular revolving train having a constant ratio and connected to the lever, the train including an output and an input shaft perpendicular to one another;
a sealed housing, the train extending out from the housing;
a drive means kinematically coupled to the output shaft in a positive interengaging relationship;
a first and second output member movable substantially parallel to the first axis, the first output member being directly connected to the lever by means of a joint and only transferring a pivotal motion of the lever about the second axis, the second output member being kinematically coupled to the lever by the train and only transferring a pivotal motion of the lever about the first axis; and
a transmitting means connecting the second output member to the output shaft.

14. The device according to claim 13 wherein the train comprises bevel gears.

15. A device according to claim 13 wherein the ratio of the train is not equal to 1.

16. A device according to claim 13 further comprising a clamp-type coupling and a one-armed output lever, the one-armed output lever connecting the second output member to the output shaft, the clamp-type coupling clamping the output lever to the output shaft in a manner allowing attainment of a wide variety of angular positions.

17. A device according to claim 16 further comprising a plurality of longitudinally adjacent connecting bores for mounting the output members, the connecting bores being positioned on at least one of the lever and the output lever.

18. A device according to claim 17 further comprising a slot and a trunnion, the trunnion extending transversely through the slot, and the slot splitting in a fork-like manner an end of the input shaft.

19. A device according to claim 13 wherein the input shaft comprises a radial angled portion, the lever being mounted on the angled portion along the second axis of the lever which is remote from the axis of rotation of the input shaft.

20. A device according to claim 13 wherein the first output member is arranged in a central longitudinal bore of the input shaft.

21. A device according to claim 20 wherein the first output member is axially guided in the longitudinal bore of the input shaft and the lever is longitudinally movably supported on a mounting structure providing the second axis.

22. A device according to claim 13 further comprising a tubular connection piece aligned coaxially with the input shaft and positioned on the housing on a side thereof remote from the input shaft and a counter-supporting structure for guides of the output members, the tubular connection piece carrying at a free end thereof the counter-supporting structure.

23. A device according to claim 22 wherein the counter-supporting structure includes connecting elements which are adapted to be connected to the housing of the train in a manner selected from the group consisting of mirror-inverted fashion, several angular positions and combinations thereof.

24. A device according to claim 13 wherein the output member are movable connecting ends of push-pull cables.

* * * * *